United States Patent Office 3,277,055
Patented Oct. 4, 1966

3,277,055
SULFONATE-CARBOXYLATE-THIOCARBONATE COPOLYMERS
Eugene P. Goldberg, Highland Park, and Frank Scardiglia, Arlington Heights, Ill., assignors to Borg-Warner Corporation, Chicago, Ill., a corporation of Illinois
No Drawing. Filed Apr. 3, 1962, Ser. No. 184,655
3 Claims. (Cl. 260—49)

This invention relates in general to linear condensation copolymers. More specifically, this invention is directed to polyester copolymers derived from diphenols, sulfonylcarbonyl chlorides and thiophosgene and/or bisthiochloroformates and to their method of preparation.

Polyesters derived from diphenols and phosgene are known in the art. Various polysulfonate homopolymers are also known. While each demonstrates properties which are of value in various commercial applications, they generally lack the combination of properties necessary to popularize their use in the plastics industry. More versatile linear condensation polymers include the novel classes of aromatic polysulfonate copolymers derived from diphenols and mixed aromatic disulfonyl chlorides disclosed and claimed in our prior application Serial Number 80,014 filed January 3, 1961, now Patent No. 3,236,808 and aromatic polysulfonate copolymers derived from aromatic disulfonyl chlorides and mixed diphenols disclosed and claimed in our prior application Serial Number 118,480 filed April 24, 1961, now Patent No. 3,236,809.

The new copolymer compositions of the present invention have highly desirable physical, chemical and electrical properties, together with other long sought attributes of commercial importance More particularly, the new class of linear condensation copolymers herein described and claimed possess a desirable combination of properties. They have high tensile strength, good impact and flexural strength, can be selectively formulated so as to exhibit a wide range of softening temperatures, viscosities, etc. They also possess unique properties, such as high heat distortion temperatures, high melting points and good hydrolytic stability, which fit them for use in the polymer field as films, fibers, molded parts, protective coatings, adhesives, etc. Thus, the copolymers of the present invention are a more versatile class of compounds than simple polysulfonate or polycarboxylate homopolymers.

The compositions of this invention comprise new linear copolyesters containing structural units derived from one or more diphenols reacted with one or more sulfonylcarbonyl chlorides and thiophosgene and/or one or more bisthiochloroformates. The aliphatic or aromatic thiocarbonate and sulfonate-carboxylate ester structural units formed thereby occur in various fashions in the linear copolymer chain. More specifically, the linear copolymers of the present invention are comprised of recurring (1) sulfonate-carboxylate ester structural units of the formula—

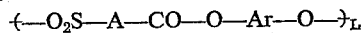

Formula I and (2) thiocarbonate ester structural units of the formula—

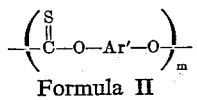

Formula II or—

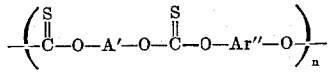

Formula IIa wherein Ar, Ar' and Ar'' are bivalent aromatic carbocyclic containing groups and A and A' are bivalent organic radicals selected from the group consisting of (a) aromatic carbocyclic containing groups, (b) aliphatic containing groups, and (c) aliphatic-aromatic containing groups. The groups (a), (b) and (c) may also contain hetero atoms other than carbon. Also, L, $m$ and $n$ are integers equal to or greater than one, and Ar, Ar', Ar'', A and A' may be the same or different. These copolymers may be of a random type in which the above mentioned structural units are propagated along the copolymer chain in a random manner or they may be block copolymers in which one or both of the structural units is itself polymeric, as for example, where L or $m$ or $n$ or both L and $m$ or $n$ are substantially greater than one. Such structures may be achieved, for example, by the formation of an aryl polysulfonate-carboxylate from an aryl sulfonylcarbonyl chloride and a diphenol followed by addition of thiophosgene and further polycondensation. It is apparent that block structures themselves are susceptible to regular or random arrangements as indicated by the method of preparation.

The compositions of the present invention comprise linear condensation copolymers prepared typically under interfacial polycondensation conditions from one or more diphenols, one or more sulfonylcarbonyl chlorides and one or more bisthiochloroformates and/or thiophosgene. Essentially any dihydric phenol is useful in the practice of this invention. The diphenol may be generally represented by Formula III:

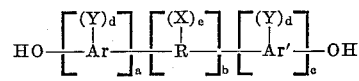

Formula III wherein R is an alkylene, alkylidene or cycloaliphatic linkage, e.g., methylene, ethylene, propylene, isopropylene, isopropylidene, butylene, isobutylene, anylene, cyclohexylene, cyclopentylidene, etc.; a linkage selected from the group consisting of ether; carbonyl; amino; a sulfur containing linkage, e.g., sulfide, sulfoxide, sulfone; a silicon containing linkage, e.g., silane or siloxy; a phosphorus containing linkage; etc. R can also consist of two or more alkylene or alkylidene linkages connected by such groups as aromatic, amino, ether, carbonyl, silane, siloxy, sulfide, sulfoxide, sulfone, a phosphorus containing linkage, etc. Other groups which are represented by R will occur to those skilled in the art.

Ar and Ar' are mono- or polycarbocyclic aromatic groups such as phenylene, biphenylene, terphenylene, naphthylene, etc. Ar and Ar' may be the same or different.

Y is a substituent selected from the group consisting of organic, inorganic or organometallic radicals. The substituents represented by Y include (1) halogen, e.g., chlorine, bromine, fluorine or (2) ether groups of the general formula OE, wherein E is a monovalent hydrocarbon radical similar to X or (3) monovalent hydrocarbon groups of the type represented by R or (4) other substituents, e.g., nitro, cyano, etc., said substituents being essentially inert to the polymerization reaction environment.

X is a monovalent hydrocarbon group exemplified by the following: alkyl, such as methyl, ethyl, propyl, isopropyl, butyl, decyl, etc.; aryl groups, such as phenyl, naphthyl, biphenyl, xylyl, tolyl, etc.; aralkyl groups, such as benzyl, ethylphenyl, etc.; cycloaliphatic groups, such as cyclopentyl, cyclohexyl, etc.; as well as monovalent hydrocarbon groups containing inert substituents therein. It will be understood that where more than one X is used they may be alike or different.

$d$ is a whole number ranging from 0 to a maximum equivalent to the number of replaceable hydrogens substituted on the aromatic rings comprising Ar or Ar'. $e$ is a whole number ranging from 0 to a maximum controlled by the number of replaceable hydrogens on R. $a$, $b$, and $c$ are whole numbers including 0. When $b$ is not 0, neither $a$ nor $c$ may be 0. Otherwise either $a$ or $c$, but not both, may be 0. Where $b$ is 0 in Formula III, the aromatic groups are joined by a direct bond between the carbocyclic ring carbon atoms with no connecting alkyl or other linkage.

The hydroxyl and Y substituents on the aromatic groups, Ar and Ar', can be varied in the ortho, meta or para positions on the aromatic rings and the groups can be in any possible geometric relationship with respect to one another.

Formula III for the diphenols may also be more generally and conveniently depicted by Formula IV, wherein the aromatic carbocyclic group D represents all of the Formula III molecule except the hydroxyl functions:

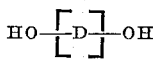

Formula IV

Examples of difunctional phenols that are useful in the practice of this invention include bisphenols of which the following are representative:

2,2-bis-(4-hydroxyphenyl)-propane (Bisphenol-A);
bis-(2-hydroxyphenyl)-methane;
bis-(4-hydroxyphenyl)-methane;
1,1-bis-(4-hydroxyphenyl)-ethane;
1,2-bis-(4-hydroxyphenyl)-ethane;
1,1-bis-(3-chloro-4-hydroxyphenyl)-ethane;
1,1-bis-(3,5-dimethyl-4-hydroxyphenyl)-ethane;
2,2-bis-(3-phenyl-4-hydroxyphenyl)-propane;
2,2-bis-(4-hydroxynaphthyl)-propane;
2,2-bis-(4-hydroxyphenyl)-pentane;
2,2-bis-(4-hydroxyphenyl)-hexane;
bis-(4-hydroxyphenyl)-phenyl-methane;
bis-(4-hydroxyphenyl)-cyclohexylmethane;
1,2-bis-(4-hydroxyphenyl)-1,2-bis-(phenyl)-ethane;
2,2-bis-(4-hydroxyphenyl)-1-phenylpropane;
bis-(3-nitro-4-hydroxyphenyl)-methane;
bis-(4-hydroxy-2,6-dimethyl-3-methoxyphenyl)-methane;
2,2-bis-(3,5-dichloro-4-hydroxyphenyl)-propane;
2,2-bis-(3-bromo-4-hydroxyphenyl)-propane.

The preparation of these and other applicable bisphenols is known in the art. They are most commonly prepared by condensation of two moles of a phenol with a single mole of a ketone or aldehyde.

Also useful are dihydroxybenzenes typified by hydroquinone and resorcinol; dihydroxybiphenols, such as 4,4'-dihydroxybiphenyl, 2,2'-dihydroxybiphenyl, 2,4'-dihydroxybiphenyl; and dihydroxynaphthalenes, such as 2,6-dihydroxynaphthalene, etc.

Dihydroxyaryl sulfones are also useful, such as bis-(4-hydroxyphenyl)-sulfone; 2,4'-dihydroxyphenyl sulfone; 2,4'-dihydroxy-5'-chlorophenyl sulfone; 3'-chloro-4,4'-dihydroxyphenyl sulfone; bis-(4-hydroxyphenyl)-biphenyl disulfone; etc. The preparation of these and other useful dihydroxyarylsulfones is described in United States Patent 2,288,282 issued to Huissmann. Polysulfones as well as sulfones substituted with halogen, nitro, alkyl and other substituents are also useful. In addition, related sulfides and sulfoxides are applicable.

Dihydroxyaromatic ethers are useful and may be prepared by methods found in the United States Patent 2,739,171 issued to Linn and in "Chemical Reviews," 38, 414–417 (1946). Typical of such dihydroxyaryl ethers are the following:

4,4'-dihydroxyphenyl ether;
4,4'-dihydroxy-2,6-dimethylphenyl ether;
4,4'-dihydroxy-3,3'-diisobutylphenyl ether;
4,4'-dihydroxy-3,3'-diisopropylphenyl ether;
4,4'-dihydroxy-3,2'-dinitrophenyl ether;
4,4'-dihydroxy-3,3'-dichlorophenyl ether;
4,4'-dihydroxynaphthyl ether; etc.

The many other types of suitable dihydroxyaryl compounds will be apparent to those skilled in the art.

The sulfonylcarbonyl chlorides that may be used in this invention may be generally represented by Formula V:

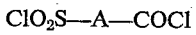

Formula V wherein A is defined as an aromatic group, aliphatic group or a group containing both aliphatic and aromatic organic radicals. Examples of sulfonylcarbonyl chlorides that are useful in the practice of this invention are the sulfonylbenzoyl chlorides of which the following are representative: o, m, and p-sulfonylbenzoyl chloride; 3-sulfonyl-4-chlorobenzoyl chloride; 3-sulfonyl-4-methylbenzoyl chloride; 3-sulfonyl-4-methoxybenzoyl chloride. Also useful are biphenyl sulfonylcarbonyl chlorides of which the following are typical: 2-sulfonyl-2'-biphenylcarbonyl chloride and 4-sulfonyl-4'-biphenylcarbonyl chloride. Arylsulfone sulfonylcarbonyl chlorides, such as 3-sulfonyl-3'-phenylsulfonecarbonyl chloride, are useful as are diaryl alkane compounds typified by 4-sulfonyl-4'-diphenylmethanecarbonyl chloride. Aryl ether sulfonylcarbonyl chlorides, such as 4-sulfonyl-4'-phenylethercarbonyl chloride; 2-sulfonyl-4'-phenylethercarbonyl chloride; 4-sulfonyl-4'-biphenylethercarbonyl chloride; etc., are applicable as are naphthalene and anthracene derivatives, such as the following: 1-sulfonyl-4-naphthalenecarbonyl chloride; 2-sulfonyl-6-naphthalenecarbonyl chloride; 8-sulfonyl-1-anthracenecarbonyl chloride; etc. Numerous other types of suitable aromatic sulfonylcarbonyl chlorides will be apparent to those skilled in the art.

Aliphatic sulfonylcarbonyl chlorides are also useful and are exemplified by: sulfonylacetyl chloride; 2-sulfonylstearyl chloride; and ω-sulfonylstearyl chloride; etc. Also alkyl aryl sulfonylcarbonyl chlorides may be used, such as 4-sulfonylphenylacetyl chloride; 3-sulfonylphenylacetyl chloride; 2-sulfonylphenylacetyl chloride; etc. Numerous other types of suitable sulfonylcarbonyl chlorides will be apparent to those skilled in the art.

The thiocarbonate group precursors most conveniently used in the practice of the present invention are thiophosgene ($CSCl_2$) and alkyl, aryl or alkaryl bisthiochloroformates which may be generally represented by Formula VI:

Formula VI

Bisthiochloroformates are most usually prepared by the reaction of thiophosgene with a dihydroxy compound generally indicated by the following equation:

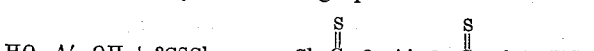

A' in Formula VI may be an alkylene, alkylidene or cycloaliphatic group as defined for R in Formula III; an alkylene, alkylidene or cycloaliphatic group containing ethylenic unsaturation; aromatic group, such as phenylene, naphthylene, biphenylene, substituted phenylene, etc.; two or more aromatic groups connected through non-aromatic groups, such as those defined by R in Formula III; or an aralykyl group, such as tolylene, xylylene, etc.

Aliphatic bisthiochloroformates are those in which the two oxygen atoms of the chloroformate functions are bonded directly to aliphatic carbon atoms in A of Formula VI and are exemplified by bisthiochloroformates of the following dihydroxy compounds: ethylene glycol; diethylene glycol; thiodiglycol, ethylene dithiodiglycol; 1,2-propanediol; 1,3-propanediol; 1,2-butanediol; 1,3-butanediol; 1,4-butanediol; 2,3 - butanediol; 2,2-dimethyl-1,3-propanediol; 2 - methyl-2-ethyl-1,3-propanediol; 1,5-pentanediol; 2-ethyl-1,3-propanediol; 1,6-hexanediol; 1,7-heptanediol; 1,8-octanediol; 1,10-decanediol; 1,2-cyclopentanediol; 1,2-cyclohexanediol; o-, m-, and p-xyleneglycol; 2,2-bis-(4-hydroxycyclohexyl)-propane; 1,5- and 2,7-dihydroxydecahydronaphthalene; 2,2,4,4-tetramethyl-1,3-cyclobutanediol; all the glycols which are produced by the polymerization of epoxides, such as ethylene oxide, propylene oxide, styrene oxide, etc.

Examples of aliphatic-aromatic bisthiochloroformates are those in which one of the oxygen atoms of the chloroformate function is bonded directly to an aliphatic carbon atom and one linked to an aromatic carbon atom in A in Formula VI and are exemplified by the bisthiochloroformates of the following compounds: 2-(4-hydroxyphenyl)-ethanol; 2-(3-hydroxyphenyl)-ethanol; 2-(2-hydroxyphenyl)-ethanol; and diphenols that have been reacted with one mole of an epoxide to produce an hydroxyalkyl group. Monohydroxyethylated diphenols are compounds that are useful and may be represented by the following formula:

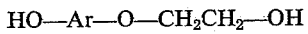

Formula VII in which Ar is an aromatic radical as hereinbefore described.

Bisthiochloroformates derived from diphenols, such as those diphenols hereinbefore described in relation to Formula IV, may also be used. Numerous other suitable bisthiochloroformates will occur to those skilled in the art.

It is to be noted that in the preparation of the copolymers of this invention using thiophosgene as the thiocarbonate linkage precursor, "in situ" formation of the hydroxy compound mono- and bisthiochloroformates takes place as one step in the polymer forming sequence of reactions. The mode and stoichiometry of reactant addition will influence the extent of "in situ" bisthiochloroformate production, e.g. using a thiophosgene to diphenol mole ratio of 2:1 and adding the diphenol to thiophosgene, the predominant intermediate is the bisthiochloroformate. Subsequently, there will be further addition of diphenols and addition of sulfonylcarbonyl chlorides to yield the final desired copolymer.

Although the materials of this invention may be prepared by conventional condensation procedures, it is preferred to conduct the polycondensation via an interfacial polymerization technique. Polymerizations may be carried out at or near room temperature by mixing a basic aqueous solution of an alkali metal salt of one or more diphenols with one or more bisthiochloroformates and/or thiophosgene and one or more sulfonylcarbonyl chlorides contained in an inert organic solvent. The addition of a basic organic catalyst, such as a quaternary ammonium salt or a suitable amine, is useful in promoting the higher molecular weights. The reaction mixtures are preferably stirred vigorously for varying periods of time and the copolymers precipitated or coagulated by any suitable means, as for example, by addition of a non-solvent, such as isopropyl alcohol. The precipitated copolymers are generally washed to remove any residual impurities and dried.

The organic solvent utilized for the sulfonylcarbonyl chlorides, thiophosgene and/or bisthiochloroformates mixture may be any inert organic solvent which preferably also has some solvent power with respect to the polymer formed. Typical of such solvents are methylene chloride, tetrachloroethylene, tetrachloroethane, chloroform, carbon tetrachloride, o-dichlorobenzene, etc. The concentration of reactants in the aqueous and organic phases may vary over a relatively wide range, from less than one weight percent to more than 20 weight percent, being limited at the high concentrations only by the increasing difficulties encountered in handling the extremely viscous media encountered. Polymerization time may be varied from less than five minutes to more than three hours depending upon the reactivity of the copolymer reactants and the molecular weight desired. Extremely short polymerization periods will generally result in lower molecular weight copolymers as compared with longer polymerization times which give higher molecular weights. Although it is preferred to use molar quantities of diphenols equal to the molar amount of sulfonylcarbonyl chlorides and thiophosgene and/or bisthiochloroformates, the reaction conditions are such that the use of exact stoichiometry is not critical to the attainment of relatively high molecular weights. Thus, in fact, block copolymers are readily obtained using incremental reactant addition. The mode of addition of the sulfonylcarbonyl chlorides, thiophosgene and/or bisthiochloroformates to the diphenols is therefore governed by the nature of the copolymer desired, and it is possible to add incrementally or to batch-mix the reactants if desired. The various sulfonylcarbonyl chlorides, thiophosgene and/or bisthiochloroformates need not be added together but may be added one at a time or as alternate increments, again depending upon the polymer structure sought, i.e., random, random-block, block-block, etc. In addition, it is also possible to invert the order of addition of reactants and add the diphenols to the sulfonylcarbonyl chlorides, thiophosgene and/or bisthiochloroformates.

Although random copolymers (consisting of structural units propagated along the polymer chain in an essentially random fashion) are readily prepared, block copolymers of tailored structure may also be easily prepared (in which at least one of the structural units in the copolymer chain is itself polymeric). The diphenol-sulfonylcarbonyl chloride-thiophosgene or bisthiochloroformate reaction is a particularly convenient method for the preparation of block copolymers. Thus, block copolymers may be prepared, for example, by reaction of at least one aryl sulfonylcarbonyl chloride initially with at least one dihydric phenol followed by reaction with thiophosgene or at least one bisthiochloroformate. Alternately, thiophosgene or at least one bisthiochloroformate may be reacted with at least one diphenol followed by further reaction with at least one aryl sulfonylcarbonyl chloride. Similarly, block-block structures may be prepared, as for example, by mixing a polymeric diphenol-thiophosgene reaction mixture and a polymeric diphenol-aryl sulfonylcarbonyl chloride reaction mixture, with or without further addition of sulfonylcarbonyl chlorides or thiophosgene or diphenols.

The basic organic catalyst may be added initially or during the course of the polycondensation. The catalyst may also be added incrementally during the course of the polycondensation. Although benzyltrimethylammonium chloride is a particularly effective catalyst, other quaternary salts and suitable amines are effective. The amount of catalyst added may vary from less than .01 weight percent to more than 1.0 weight percent. Although the polymerization temperature may be varied over a wide range, as for example, from less than 0° C. to more than 100° C., it is more convenient to conduct the reaction at or about room temperature, i.e., 25° C.

The use of at least one sulfonylcarbonyl chloride and at least one bisthiochloroformate or thiophosgene results in copolymer compositions whose properties may be widely varied according to the structure and relative proportions of sulfonylcarbonyl chlorides, thiophosgene and/or bisthiochloroformates. For example, a relatively stiff molecular chain as obtained with a sulfonylbenzoyl chloride is made more flexible and consequently tougher through copolymerization with a less rigid bisthiochloroformate. The relative proportions of the two ingredients may be widely varied such that the sulfonylcarbonyl chlorides, typified by Formula V or VI, may constitute less than five mole percent or in excess of 95 mole percent of the total sulfonylcarbonyl chloride-bisthiochloroformate or sulfonylcarbonyl chloride-thiophosgene mix.

A copolymer derived from one or more diphenols, one or more sulfonylcarbonyl chlorides and one or more bisthiochloroformates or thiophosgene, therefore, will comprise the following formulas: (VIII) sulfonatecarboxylate ester structural units and (IX and/or IXa) thiocarbonate ester structural units in the polymer chain—

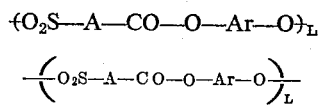

Formula VIII

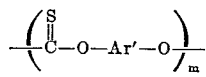

Formula IX

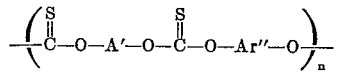

Formula IXa wherein the radicals Ar, Ar' and Ar'' are bivalent aromatic carbocyclic containing groups and A and A' are bivalent organic radicals selected from the group consisting of (a) aromatic carbocyclic containing groups, (b) aliphatic containing groups and (c) aliphatic-aromatic containing groups, and wherein (a), (b) and (c) may contain hetero atoms other than carbon. Sub L, $m$ and $n$ above are integers equal to or greater than one, and Ar, Ar', Ar'', A, and A' may be the same or different. It is to be noted that (1) the aromatic carbocyclic containing groups Ar, Ar' and Ar'' are derived from diphenols and are bonded through aromatic ring carbon atoms to sulfonate group, carboxylate group or thiocarbonate group linking oxygen atoms and (2) A groups are derived from sulfonylcarbonyl chlorides and each group is bonded directly through aliphatic carbon atoms or aromatic ring carbon atoms to one carboxylate group carbon atom and to one sulfonate group sulfur atom; A' groups are derived from aliphatic or aromatic bisthiochloroformates and are bonded directly through aliphatic carbon atoms or aromatic ring carbon atoms to thiocarbonate group linking oxygen atoms.

The following examples are illustrative of the preparation of sulfonate-thiocarbonate-carboxylate copolymers from diphenols, sulfonylcarbonyl chlorides and bisthiochloroformates or thiophosgene.

*Example I.—Reaction of Bisphenol-A, thiophosgene and m-sulfonylbenzoyl chloride*

A solution of 2.93 g. (25.5 m. mole, 85 mole percent) of thiophosgene and 1.08 g. (4.5 m. mole, 15 mole percent) of m-sulfonylbenzoyl chloride in 150 ml. of methylene chloride was added rapidly at 5° C. to a solution of 6.83 g. (30 m. mole) of Bisphenol-A, 66 m. mole of sodium hydroxide, eight drops of a 60 percent aqueous solution of benzyltrimethylammonium chloride in 150 ml. of water. After one hour and 45 minutes, the reaction mixture was added to an excess of isopropanol, washed several times with isopropanol and water and dried over night in a vacuum oven. The polymer had an intrinsic viscosity, measured in 1,1,2,2-tetrachlorethane of 1.00 dl./g. A compression molded bar had a heat distortion temperature of 165–168° C. under a 264 p.s.i. load and an impact strength of 13.7 kg. cm./cm.²

*Example II.—Reaction of Bisphenol-A, 4,4'-dihydroxydiphenylether, thiophosgene and m-sulfonylbenzoyl chloride*

A solution of 5.0 g. (43.5 m. mole, 85 mole percent) of thiophosgene and 1.84 g. (7.7 m. mole, 15 mole percent) of m-sulfonylbenzoyl chloride in 150 ml. of methylene chloride was added at 5° C. to a solution of 10.5 g. (46.0 m. mole, 90 mole percent) of Bisphenol-A and 1.05 g. (5.2 m. mole, 10 mole percent) of 4,4'-dihydroxydiphenylether, 111.5 m. mole of sodium hydroxide and eight drops of a 60 percent aqueous solution of benzyltrimethylammonium chloride in 150 ml. of water. The reaction conditions and the method of isolation of the polymer were the same as in Example I. The product had an intrinsic viscosity of 0.75 dl./g.

*Example III.—Reaction of Bisphenol-A, thiophosgene and m-sulfonylbenzoyl chloride*

A solution of 2.50 g. (21.7 m. mole, 50 mole percent) of thiophosgene and 5.20 g. (21.7 m. mole, 50 mole percent) of m-sulfonylbenzoyl chloride in 150 ml. of methylene chloride was added at 5° C. to a solution of 9.9 g. (43.4 m. mole) of Bisphenol-A, 95.5 m. mole of NaOH, eight drops of 60 percent aqueous solution of benzyltrimethylammonium chloride in 150 ml. of water. The reaction conditions and the method of isolation of the polymer were essentially the same as in Example I. The polymer had an intrinsic viscosity of 1.00 dl./g., a heat distortion temperature of 145° C. under a 264 p.s.i. load and an impact strength of 3.7 kg. cm./cm².

The presence of aromatic thiocarbonate linkages along the chain of linear polyesters leads to a considerable improvement in the hydrolytic stability of the polymers. Aromatic thiocarbonate homo- and copolymers are considerably more stable toward hydrolysis than polyurethanes, polycarbonates and aromatic polyesters; most of them are even more stable to basic hydrolysis than polyamides (which are considered stable to base but unstable to acid hydrolysis).

In the following table the hydrolytic stability of molded bars ½" x ¼" x ⅛" is compared with that of other polymers. For this test of hydrolytic stability, samples were refluxed for 20 hours in ten percent aqueous sodium hydroxide and weight loss measured.

| | Percent weight loss (20 hours in refluxing ten percent NaOH) |
|---|---|
| Polyurethane (Texin[1]) | 100.0 |
| Bisphenol-A polycarbonate (Lexan[2] and Merlon[1]) | 18.7 |
| Nylon-66 (Zytel[3]) | 1.8 |
| Poly(Bisphenol-A isophthalate) | 22.1 |
| Reaction product of Example I | 2.0 |

[1] Trademark of Mobay Chemical Company.
[2] Trademark of General Electric Co.
[3] Trademark of E. I. du Pont de Nemours & Co.

From the foregoing description and examples it will be apparent that the polymer compositions of this invention are inherently versatile and useful polyesters. The combination of high softening temperatures, desirable strength characteristics and thermal and chemical stability make these compositions useful as thermoplastic molding compounds for the fabrication of molded parts, gaskets, tubing, gears, casings and the like either as virgin resin or combined with such fillers as silica, carbon black, wood flour and the like. Films are useful as packaging material, containers, covers, liners, electrical insulation, recording tapes, photographic film base, pipe wrappings, etc. Films and fibers may be oriented or drawn at suitable temperatures to permit enhancement of strength properties such as tensile and flexural strengths. Fibers may be readily formed by melt or solution spinning and are useful as yarn, thread, bristle, rope and the like. The compositions of this invention may be readily pigmented or dyed and suitable stabilizers and plasticizers as are known in the art may be incorporated. Alloying or admixture with other resinous materials may also be readily accomplished. The very desirable combination of properties found in the present compositions make them also useful for surface coating in paints, varnishes and enamels and their powerful adhesive qualities render them particularly useful as adhesives for plastic, rubber, metal, glass or wood parts.

Obviously, many modifications and variations of the invention as hereinbefore set forth may be made without departing from the spirit and scope thereof and therefore only such limitations should be imposed as are indicated in the appended claims. For example, it will be appreciated by those skilled in the art that by varying the nature of the diphenols and both the nature and the ratio of the sulfonylcarbonyl chlorides-bisthiochloroformates and/or thiophosgene, the physical and chemical properties of the resulting products will be affected.

We claim:

1. A linear copolymer composition having a heat distortion temperature in excess of 145° C. and improved hydrolytic stability as indicated by less than 3 percent weight loss of a ½" x ¼" x ⅛" sample treated in refluxing sodium hydroxide for twenty hours and an intrinsic viscosity in excess of 0.3 dl./g. comprising in its linear chain up to about 50 mole percent recurring (a) structural units containing sulfonate and carboxylate ester groups of the formula

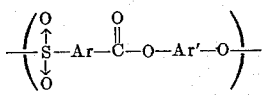

wherein Ar and Ar' are bivalent aromatic carbocyclic groups; and correspondingly at least 50 mole percent recurring (a) structural units containing thiocarbonate ester groups of the formula

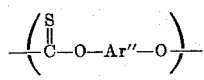

wherein Ar" is a bivalent aromatic carbocyclic group.

2. A linear copolymer composition having a heat distortion temperature in excess of 145° C. and improved hydrolytic stability as indicated by less than 3 percent weight loss of a ½" x ¼" x ⅛" sample treated in refluxing sodium hydroxide for twenty hours and an intrinsic viscosity in excess of 0.3 dl./g. comprising in its linear chain (1) up to about 50 mole percent sulfonate-carboxylate ester structural units of the formula

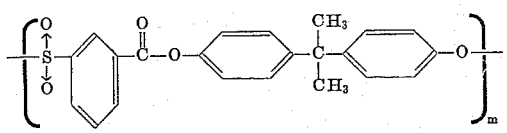

and (2) correspondingly at least 50 mole percent thiocarbonate ester structural units of the formula

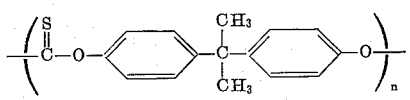

wherein $m$ and $n$ are at least one.

3. A linear copolymer composition having a heat distortion temperature in excess of 145° C. and improved hydrolytic stability as indicated by less than 3 percent weight loss of a ½" x ¼" x ⅛" sample treated in refluxing sodium hydroxide for twenty hours and an intrinsic viscosity in excess of 0.3 dl./g. comprising in its linear chain (1) up to about 50 mole percent sulfonate-carboxylate ester structural units selected from the group consisting of

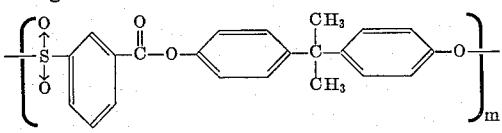

and

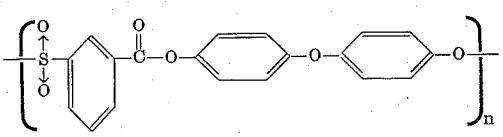

and (2) correspondingly at least 50 mole percent thiocarbonate ester structural units selected from the group consisting of

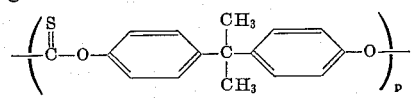

and wherein $m$, $n$, $p$ and $q$ are at least one.

References Cited by the Examiner

UNITED STATES PATENTS

| 2,035,578 | 3/1936 | Wagner | 260—47 |
| 3,028,365 | 4/1962 | Schnell | 260—47 X |
| 3,030,331 | 4/1962 | Goldberg | 260—47 X |

FOREIGN PATENTS

| 570,531 | 9/1958 | Belgium. |
| 585,882 | 6/1960 | Belgium. |
| 597,208 | 5/1961 | Belgium. |

OTHER REFERENCES

Kabaivanov et al.: Chem. Abs., vol. 56, page 5869e, March 1962, abstract of an article published in Godishnik Khim. Tekhnol. Ins., vol. 6, No. 1, pages 37–43 (1959).

SAMUEL H. BLECH, *Primary Examiner*.

LOUISE P. QUAST, JAMES A. SEIDLECK, WILLIAM H. SHORT, *Examiners*.

N. W. SHUST, J. C. MARTIN, *Assistant Examiners*.